United States Patent
Rudish

Patent Number: 6,005,419
Date of Patent: Dec. 21, 1999

[54] APPARATUS AND METHOD FOR HARMONIC REDUCTION IN A DIRECT DIGITAL SYNTHESIZER

[75] Inventor: Ronald M. Rudish, Commack, N.Y.

[73] Assignee: AIL Systems Inc., Deer Park, N.Y.

[21] Appl. No.: 08/834,360

[22] Filed: Apr. 16, 1997

[51] Int. Cl.[6] .................................................. H03B 21/00
[52] U.S. Cl. .......................... 327/107; 327/106; 708/271
[58] Field of Search ................................. 327/104, 106, 327/107, 141; 708/270, 271; 341/144

[56] References Cited

U.S. PATENT DOCUMENTS

| | | | |
|---|---|---|---|
| 4,992,743 | 2/1991 | Sheffer | 327/105 |
| 5,375,065 | 12/1994 | Owen | 327/107 |
| 5,521,533 | 5/1996 | Swanke | 327/105 |
| 5,880,689 | 3/1999 | Kushner | 341/144 |

*Primary Examiner*—Dinh T. Le
*Attorney, Agent, or Firm*—Hoffman & Baron, LLP

[57] ABSTRACT

A direct digital synthesizer circuit and method for reducing the harmonic content in a synthesized output signal. The direct digital synthesizer generates first and second address signals driving first and second sine look-up read only memory (sine ROM) circuits. The first and second sine ROMs generate first and second digital sine wave signals which are offset in phase from one another by 180 degrees. The first and second digital sine wave signals are converted to first and second analog sine wave signals. The first and second analog sine wave signals are combined in a subtractor circuit. As a result of the phase relationship between the first and second analog sine wave signals, the fundamental component of these signals are emphasized by subtraction while the second harmonic component of theses signals are simultaneously de-emphasized.

9 Claims, 8 Drawing Sheets

APPARATUS AND METHOD FOR HARMONIC REDUCTION IN A DIRECT DIGITAL SYNTHESIZER

BACKGROUND OF THE INVENTION

1. Field of the Invention

The present invention relates generally to direct digital synthesizers, and more particularly relates to a circuit and method for reducing the harmonic content of signals generated by a direct digital synthesizer.

2. Description of the Prior Art

Direct digital synthesizers (DDS) are well known in the prior art. The block diagram of FIG. 1 illustrates the topology of a known DDS. The DDS of FIG. 1 is capable of generating a sine wave signal with precise control over the phase and frequency of that signal.

Referring to FIG. 1, the DDS includes a frequency value register 2. The frequency value register 2 is operatively coupled to an external digital controller 4, such as a microprocessor. The external controller 4 provides required frequency and phase value information to the DDS. The DDS further includes a phase accumulator circuit 6. The phase accumulator 6 is essentially a counter circuit which cycles between zero and a final value determined by the frequency value received from the frequency register 2 in response to a received DDS phase clock signal.

The phase accumulator 6 generates an address signal which is illustrated in FIG. 2. The address signal is composed of a number of output states which represent equivalent phase values of the DDS output signal. The DDS further includes a sine look-up read only memory (sine ROM) circuit 8. The sine ROM 8 receives the address signal from the phase accumulator 6 and generates a digital sine wave signal in response thereto. The digital sine wave signal is illustrated in FIG. 3. It will be appreciated that while the diagrams of FIGS. 2 and 3 are illustrated graphically, these signals are actually composed of discrete digital values.

The DDS further employs a digital to analog convertor (D/A) 10 to generate an analog sine wave signal. The D/A 10 is responsive to the digital sine wave signal from the sine ROM 8 and generates a corresponding analog sine wave signal.

Because of the discrete nature of the digital sine wave signal and inherent non-linearities associated with the D/A 10, the resulting analog output signal from a conventional DDS is typically rich in harmonic content. Typically, the second harmonic (twice the desired signal frequency) is especially strong.

To eliminate the harmonics from the desired fundamental output signal, a DDS would typically rely on analog filtering techniques. However, given the broadband nature of the DDS, it is often difficult to optimize the filter parameters of a fixed analog filter to properly reduce the harmonics over the full operating frequency range of a DDS. Further, to achieve significant harmonic attenuation, a filter with many poles is required. This filter topology typically introduces signal loss to the desired signal.

As an alternative to conventional filtering, it is also known in the art that discrete signal components, such as harmonics, may be reduced by analog phase cancellation. The block diagram of FIG. 4 illustrates a simplified phase cancellation circuit. Referring to FIG. 4, an input signal including both a desired frequency component and an undesired frequency component is applied to a broad band power divider 11. The power divider 11 equally splits the power of both the desired and undesired signals into two outputs. One output of the power divider 11 is coupled to a narrow band analog phase shift network 12. The phase shift network 12 is designed to provide 0° phase shift to the desired signal and 180° phase shift to the undesired signal.

The second output of the power divider 11 is coupled to an attenuator 14. The attenuator 14 is selected to provide equivalent signal loss to that of the phase shift network 12 at the undesired frequency. In this way, the output level of the undesired frequency component is equal at both the attenuator 14 and phase shift network 12 outputs. These outputs are operatively coupled to a power combiner (adder) 16. The power combiner 16 reinforces in-phase signals and cancels out-of-phase signals. Therefore, the output of the power combiner 16 will feature a slightly reduced desired signal (inherent circuit losses) and a significantly reduced undesired signal level.

Analog phase cancellation has many disadvantages. The analog phase shifter 12 is a narrow bandwidth device. Therefore, the analog phase shift network 12 is difficult to manufacture (tuning adjustments often required) and is only usable over a limited frequency range. Also, the analog phase cancellation circuit often attenuates the desired signal. To overcome these signal loses, additional amplifiers are typically required.

OBJECTS AND SUMMARY OF THE INVENTION

It is an object of the present invention to provide a signal source which offers reduced harmonic content.

It is another object of the present invention to provide a direct digital synthesizer with reduced even mode harmonic content.

It is yet another object of the present invention to provide a circuit which will emphasize the fundamental signal generated by a direct digital synthesizer while simultaneously reducing the harmonic content of the output signal.

It is a further object of the present invention to reduce the harmonic content of a signal without the use of an analog filter or analog phase shifter.

In accordance with one form of the present invention, a direct digital synthesizer is formed having a conventional phase accumulator circuit which generates a first address signal. The first address signal from the phase accumulator circuit is operatively coupled to a first sine look-up ROM circuit (sine ROM). The first sine ROM is responsive to the first address signal and generates a first digital sine wave signal.

The DDS further includes a digital phase shift circuit. The digital phase shift circuit is responsive to the first address signal from the phase accumulator circuit and generates a second address signal. The second address signal is equivalent to the first address signal, but is offset in equivalent phase value by 180 degrees. The DDS further includes a second sine ROM circuit. The second sine ROM circuit is responsive to the second address signal and generates a second digital sine wave signal.

The first and second digital sine wave signals are applied to first and second digital to analog convertors (D/A) respectively. The first and second D/A's generate analog signals which are characterized by first and second fundamental signals, even harmonic signals and odd harmonic signals. The first and second fundamental signals (and other respective odd harmonic signals) are equal in frequency and amplitude, but opposite in phase. The even harmonic signals are equal in frequency, amplitude and in phase. The first and second D/A's are operatively coupled to a subtractor circuit. The subtractor circuit is responsive to the first and second analog signals and generates an output signal in which the fundamental signal (and odd harmonics) are emphasized and the second harmonic (and other even harmonic signals) are substantially canceled.

In accordance with another form of the present invention, a direct digital synthesizer is formed having a conventional phase accumulator circuit which generates an address signal. The address signal from the phase accumulator circuit is operatively coupled to a first sine look-up ROM circuit (sine ROM) and a second sine ROM. The first sine ROM is responsive to the address signal and generates a first digital sine wave signal. The second sine ROM circuit is responsive to the address signal and generates a second digital sine wave signal. The second digital sine wave signal is equal in amplitude characteristics but opposite in phase to that of the first digital sine wave signal.

The first and second digital sine wave signals are applied to first and second digital to analog convertors (D/A) respectively. The first and second D/A's generate analog signals which are characterized by first and second fundamental signals, even harmonic signals and odd harmonic signals. The first and second fundamental signals (and other respective odd harmonic signals) are equal in frequency and amplitude, but opposite in phase. The even harmonic signals are equal in frequency, amplitude and in phase. The first and second D/A are operatively coupled to a subtractor circuit. The subtractor circuit is responsive to the first and second D/A signals and generates an output signal in which the fundamental signal (and odd harmonics) are emphasized and the second harmonic (and other even harmonic signals) are substantially canceled.

In accordance with another form of the present invention, a DDS is formed having a dual phase accumulator circuit. The dual phase accumulator circuit generates first and second address signals. The first and second address signals each represent equivalent phase values of digital sine wave signals which are offset in phase by 180 degrees to one another. The first and second address signals are operatively coupled to first and second sine ROM circuits which generate first and second digital sine wave signals in response thereto. The first and second digital sine wave signals are operatively coupled to first and second D/A's which generate first and second analog signals in response thereto. The analog output signals from the first and second D/A's are operatively coupled to a subtractor circuit. The subtractor circuit is responsive to the first and second analog signals and generates an output signal in which the fundamental signals (and odd harmonics) are emphasized and the second harmonics (and other even harmonic signals) are canceled.

In accordance with a method of the present invention, an output signal is generated by a DDS featuring an enhanced fundamental signal and reduced harmonic content. Initially, first and second digital sine wave signals are generated which are separated in equivalent phase value by 180 degrees. From the first and second digital sine wave signals, first and second analog signals are generated. The first and second analog signals are characterized by first and second fundamental components, odd harmonic components, and even harmonic components. The first and second fundamental components are equal in frequency and amplitude but are offset by a relative phase difference substantially equal to 180°. The even harmonic components of the first and second analog signals are equal in frequency, amplitude and phase. The first and second analog signals are subtracted from one another to enhance the out-of-phase fundamental components while suppressing the in-phase even harmonic signal components.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 5:
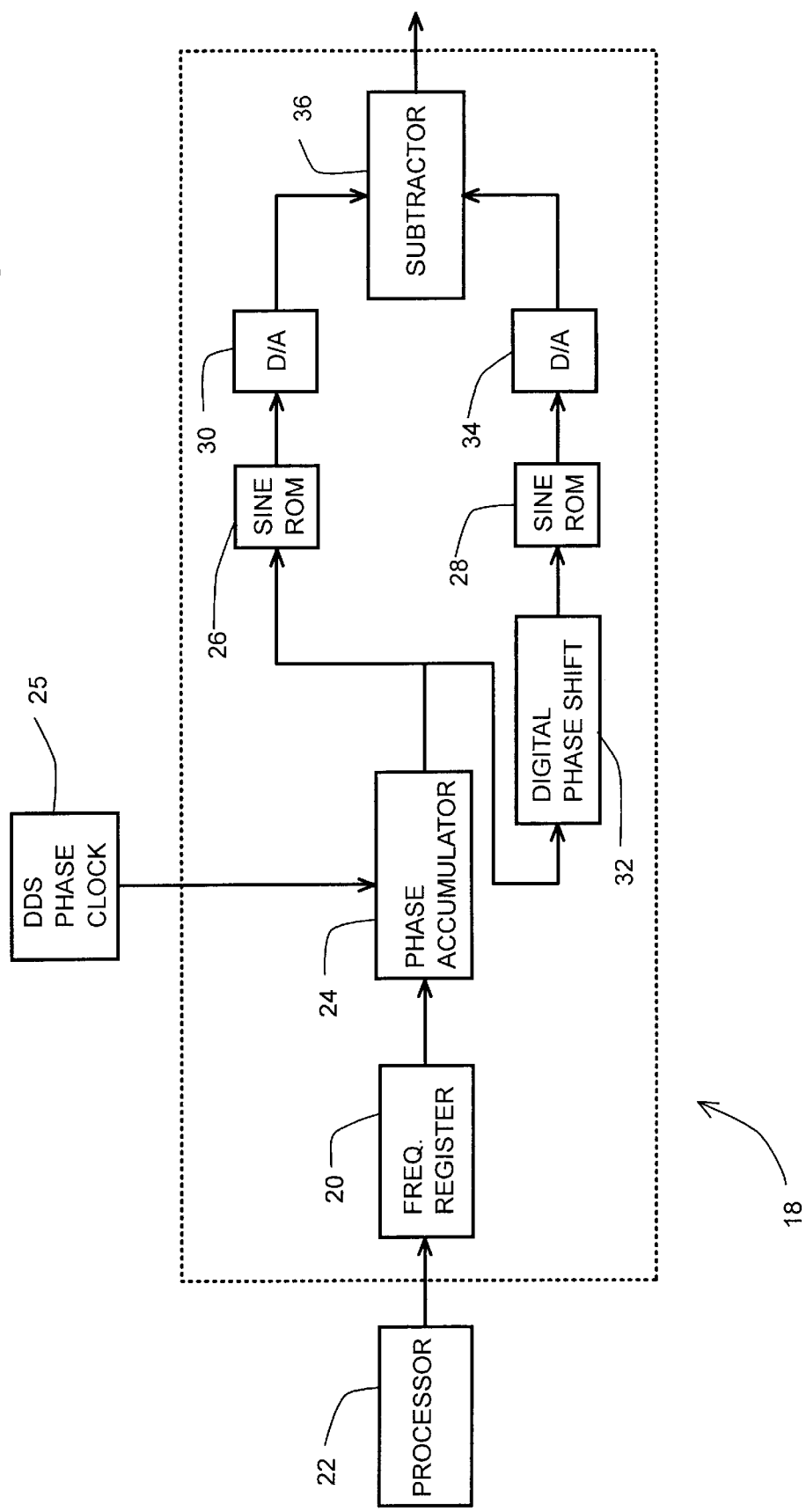
FIG. 5 is a block diagram of a harmonic suppressing direct digital synthesizer formed in accordance with the present invention.

A block diagram of a direct digital synthesizer (DDS) formed in accordance with the present invention is illustrated in FIG. 5. The DDS 18 includes a frequency register 20 operatively coupled to an external processor 22. The frequency register 20 receives and stores phase and frequency value information from the external processor 22 for the DDS 18.

Figures 1, 2, 3:
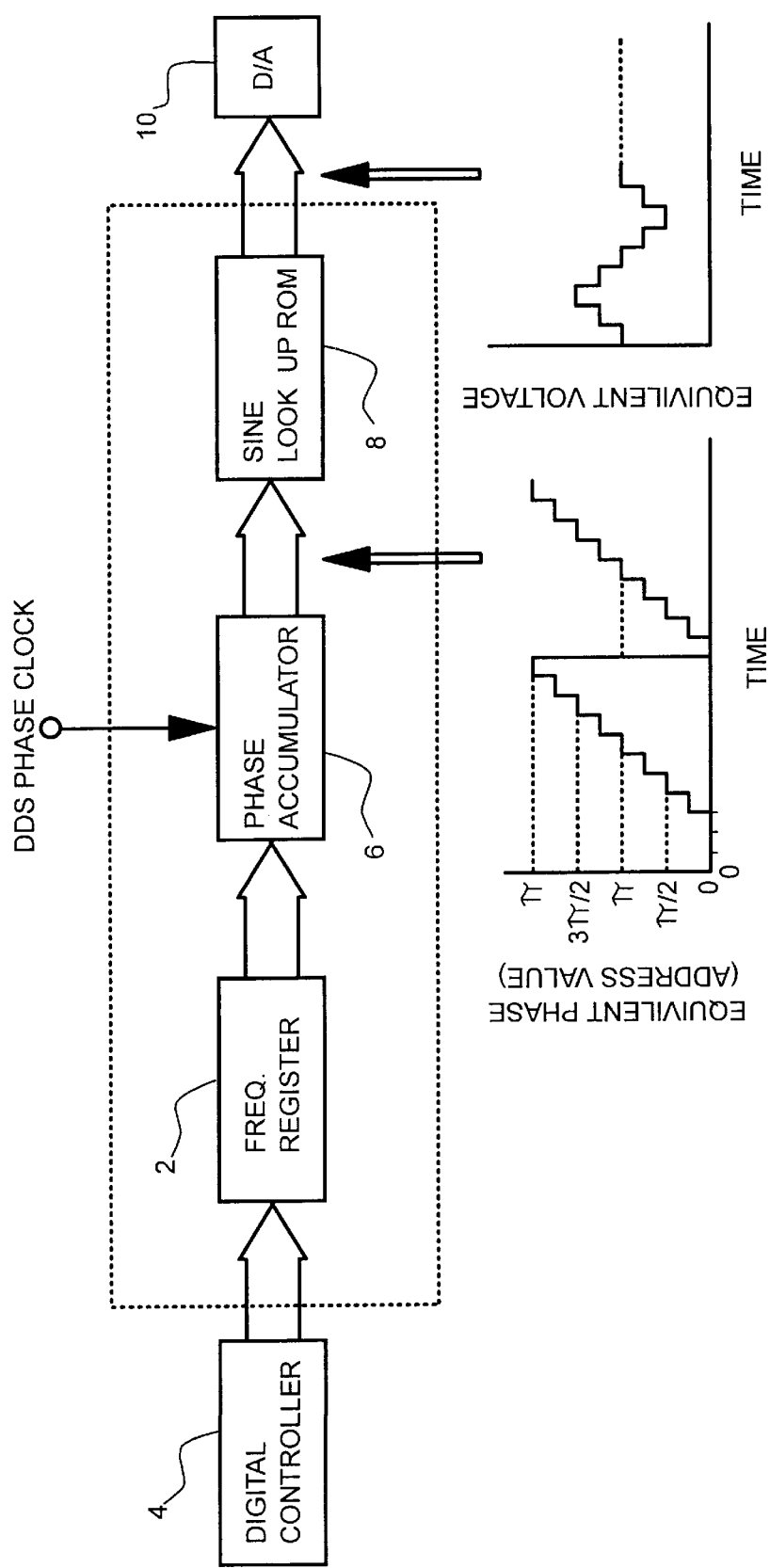
FIG. 1 is a block diagram of a direct digital synthesizer (DDS) known in the prior art.
FIG. 2 is a graphical illustration of an address signal associated with the DDS of FIG. 1.
FIG. 3 is a graphical illustration of a digital sine wave signal associated with the DDS of FIG. 1.
Figure 4:
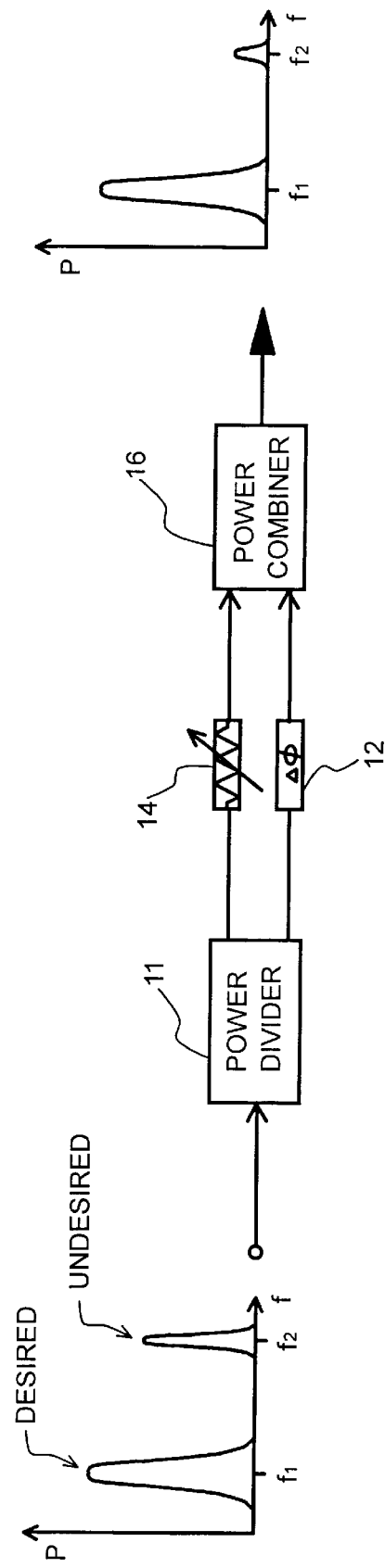
FIG. 4 is a block diagram of an analog phase cancellation circuit known in the prior art.
Figure 5A:
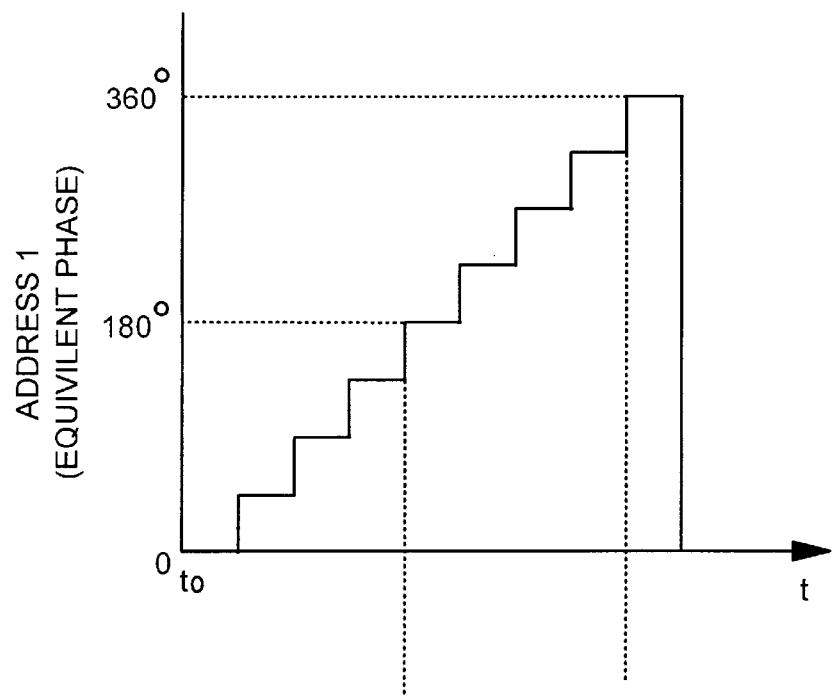
FIGS. 5A–5E are graphical diagrams illustrating signals associated with the direct digital synthesizer of FIG. 5.

The DDS 18 further includes a phase accumulator circuit 24. The phase accumulator circuit 24 is formed substantially in accordance with the prior art. The phase accumulator circuit 24 is responsive to the phase and frequency values in the frequency register 20. In response to a DDS phase clock signal received from an external DDS phase clock 25, the phase accumulator circuit 24 generates a first address signal which represents the equivalent phase value of the desired DDS output signal. The first address value signal, which is illustrated in FIG. 5A, is substantially equivalent to that illustrated in FIG. 2.

The DDS 18 further includes first and second sine look-up read only memory (sine ROM) circuits 26, 28. The first and second sine ROMs 26, 28 are equivalent to one another and each generates a digital sine wave signal in response to a received address signal. Preferably, the first and second sine ROMs will take the form of one-quarter sine ROMs, which are well known in the art of DDS design.

The first sine ROM 26 is operatively coupled to the phase accumulator circuit 24 and receives the first address signal therefrom. In response to this signal, the first sine ROM 26 generates a first digital sine wave signal. A first digital to analog convertor (D/A) 30 is operatively coupled to the first sine ROM 26. The first D/A 30 is responsive to the first digital sine wave signal and generates a first analog output signal. The first analog output signal is illustrated graphically in FIG. 5C.

Figure 5B:
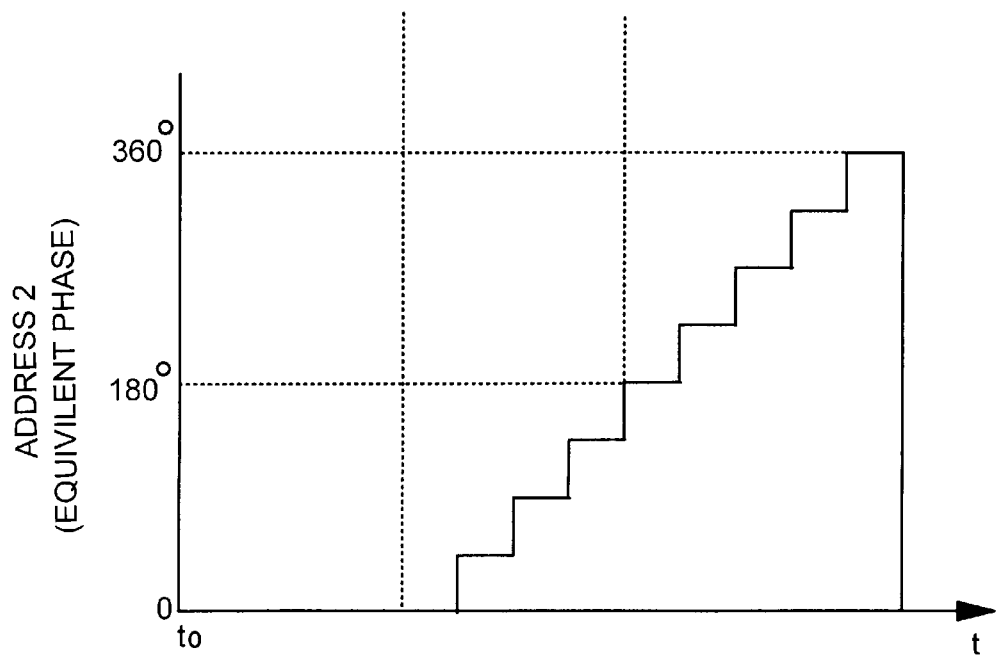

The DDS 18 further includes a digital phase shift circuit 32. The digital phase shift circuit 32 is responsive to the first address signal generated by the phase accumulator circuit 24. The digital phase shift circuit 32 generates a second address signal. The second address signal represents equivalent phase values which are offset from those in the first address signal generated by the phase accumulator 24 by 180°. The address signals from the phase accumulator 24 and the digital phase shift circuit 32 are illustrated in FIGS. 5A and 5B respectively. Together, FIGS. 5A and 5B illustrate the relative phase between the two address signals with respect to an initial time, $t_0$.

The digital phase shift circuit 32 is operatively coupled to the second sine ROM 28. In response to the second address signal, the second sine ROM 28 generates a second digital sine wave signal. Operatively coupled to the second sine ROM 28 is a second D/A convertor 34. The second D/A convertor 34 receives the second digital sine wave signal and generates a second analog output signal. The second analog output signal is graphically illustrated in FIG. 5D.

Figure 5C:
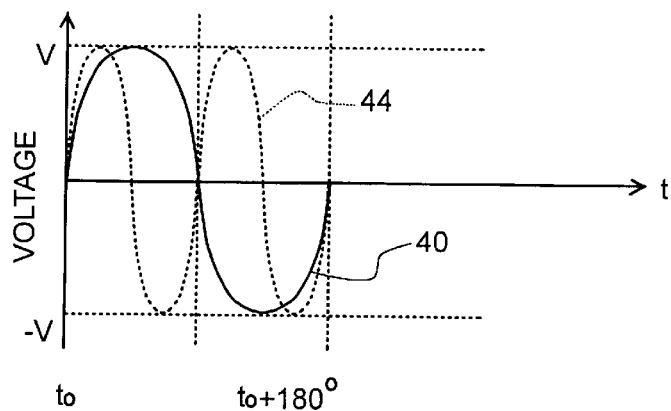
Figure 5D:
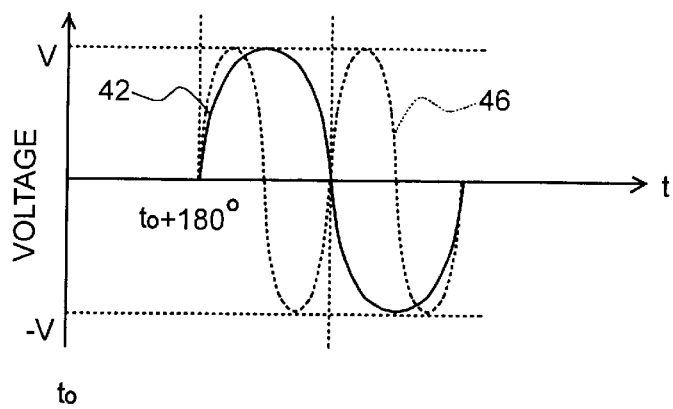
Figure 5E:
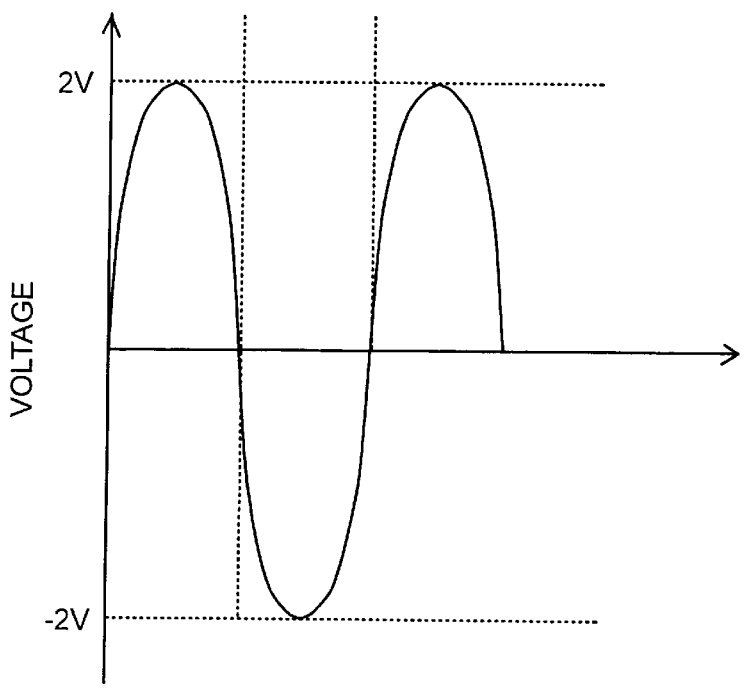

A subtractor circuit 36 is further included in the DDS of FIG. 5. The subtractor circuit 36 receives the first and second analog output signals and generates a DDS output signal in response thereto. Referring to FIGS. 5C and 5D, the analog output signals from the first and second D/A are represented as sinusoidal waveforms. In each of these figures a fundamental frequency component 40, 42 (desired signal) is illustrated along with associated second harmonic signals 44, 46 (undesired signals) respectively. As shown in the diagrams of FIG. 5C and 5D, the fundamental frequency signals are offset in phase by 180° while the second harmonic signals are in-phase. Upon signal subtraction, this relative phase relationship results in enhancement of the fundamental signal component (and other odd harmonics which are not illustrated) and cancellation of the second harmonic component (and other higher order even harmonics). An exemplary output signal from the subtractor circuit 36 is graphically illustrated in FIG. 5E.

Figure 6:
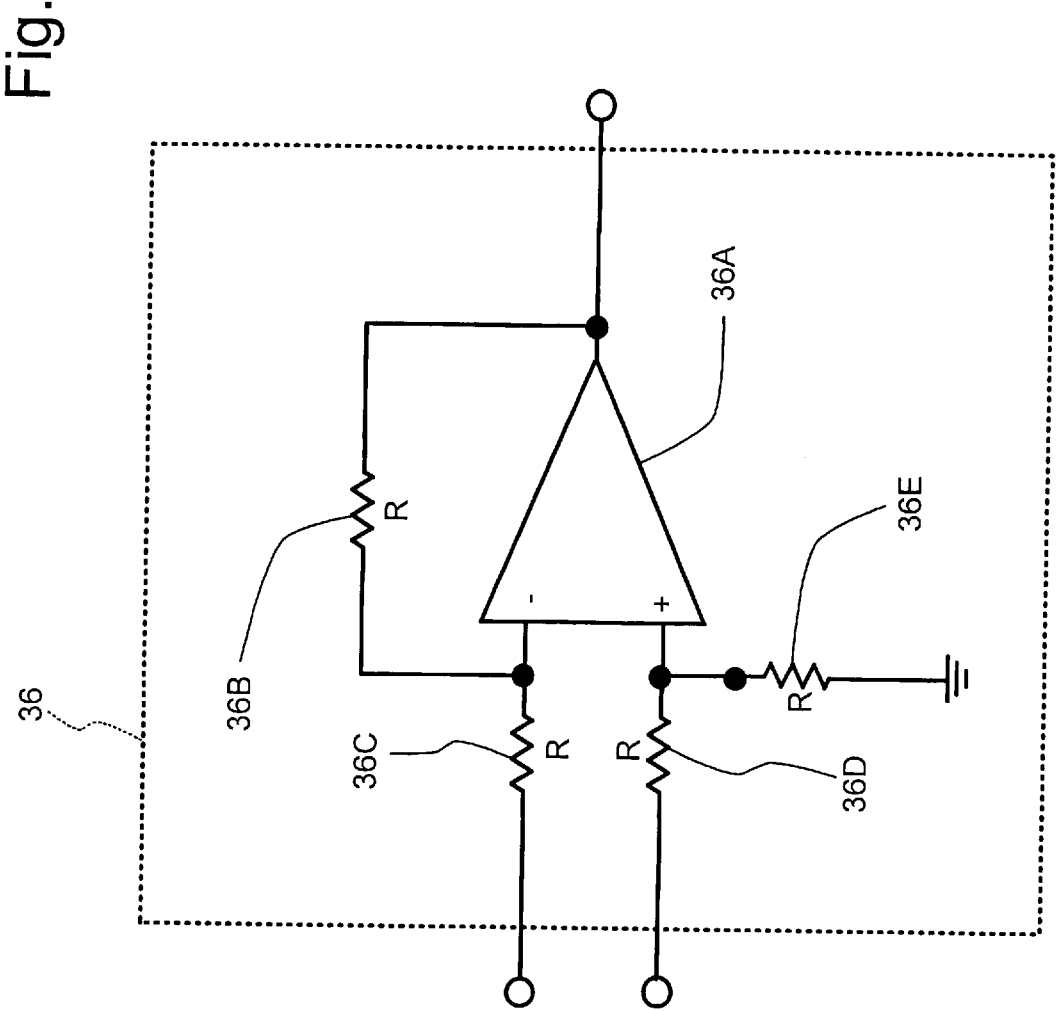
FIG. 6 is a schematic diagram of an exemplary subtractor circuit used in connection with the present invention.

The circuit topology of the subtractor circuit 36 is not critical and may be implemented using an operational amplifier (op amp), a balanced transformer, a hybrid junction and the like. An exemplary subtractor circuit 36 is illustrated schematically in FIG. 6. The circuit of FIG. 6 utilizes an op amp 36A and four equal value resistors. The first resistor 36B is operatively coupled across the op amp 36A to provide feedback between an output terminal and an inverting input terminal of the op amp 36A. The second resistor 36C is also connected to the inverting input terminal of the op amp 36A and forms one input of the subtractor circuit 36. The third and fourth resistors 36D, 36E are connected in series as a voltage divider with a first terminal functioning as the second input to the subtractor circuit, the common terminal of the voltage divider connected to the non-inverting terminal of the op amp 36A, and the remaining terminal of the voltage divider connected to a ground potential. This configuration, which is known in the art, produces a unity gain analog subtraction function at the output of the op amp 36A.

Figure 7:
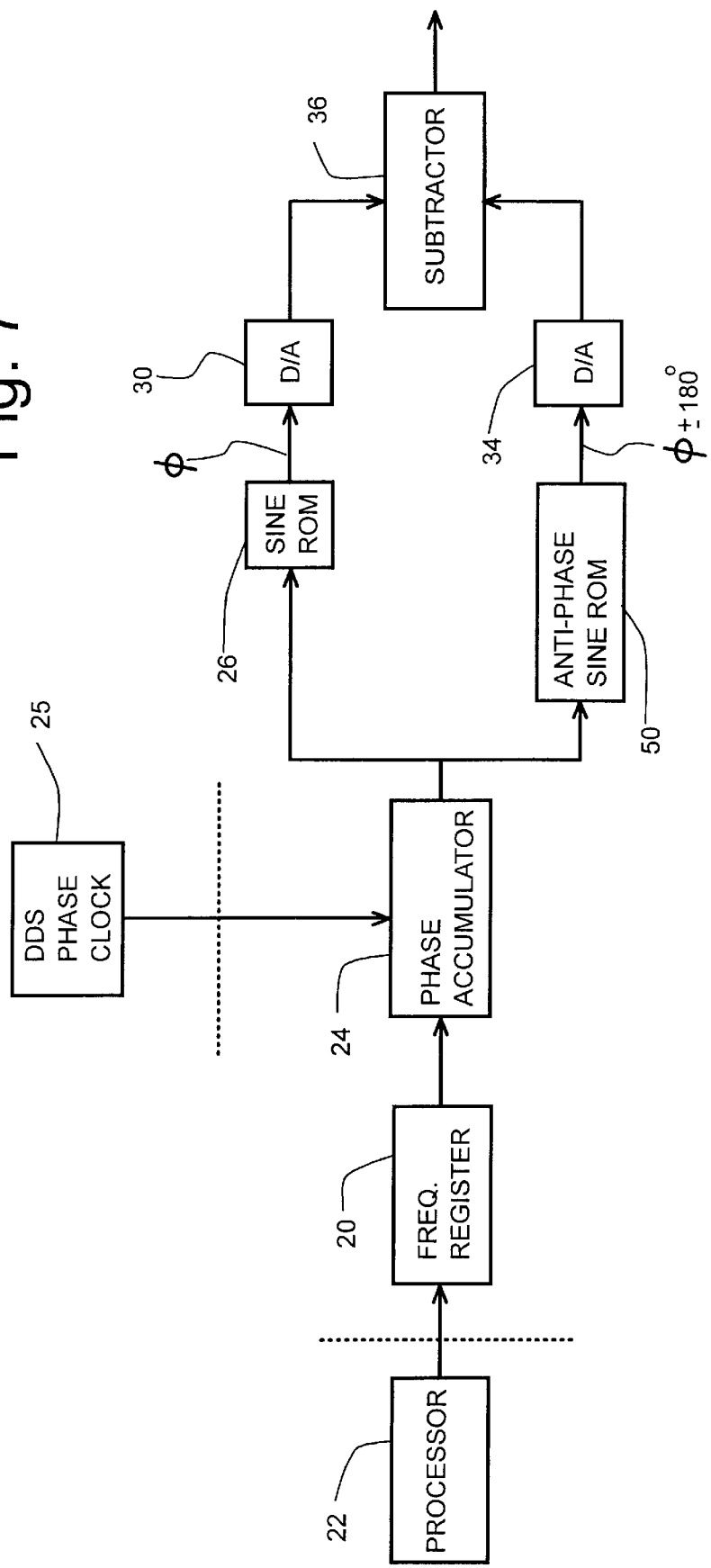
FIG. 7 is a block diagram illustrating an alternate embodiment of a harmonic suppressing direct digital synthesizer formed in accordance with the present invention.

FIG. 7 illustrates an alternate embodiment of a DDS formed in accordance with the present invention. The DDS of FIG. 7 differs from that previously discussed (FIG. 5) in that the digital phase shift circuit 32 is omitted and the second sine ROM 28 (which was identical to the first sine ROM 26 in FIG. 5) is replaced with an anti-phase sine ROM 50. The anti-phase sine ROM 50 is responsive to the address signal from the phase accumulator 24 and generates the second digital sine wave signal. In this configuration, rather than altering the address signal driving the second sine ROM 28 (FIG. 5), the contents of the second sine ROM 28 are altered to form the anti-phase sine ROM 50 and thereby achieve the desired phase offset between the first and second digital sine wave signals.

Figure 8:
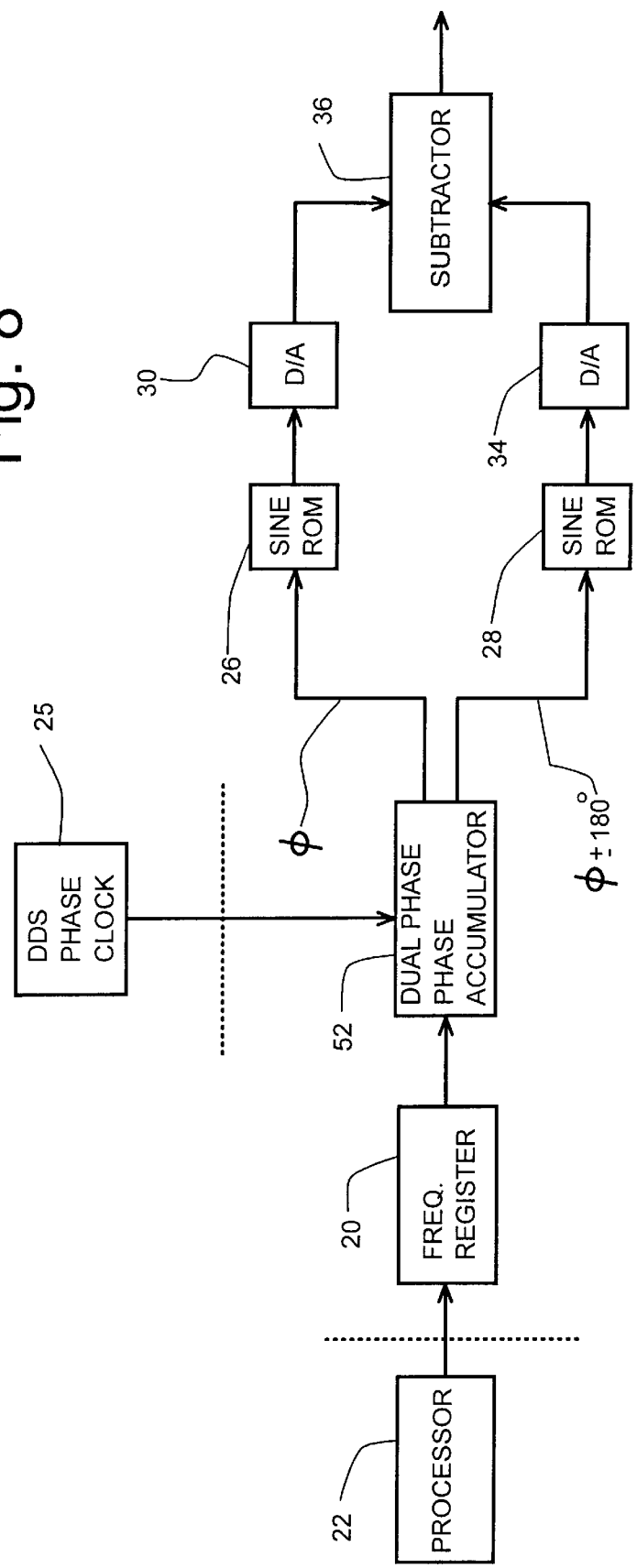
FIG. 8 is a block diagram illustrating an alternate embodiment of a harmonic suppressing direct digital synthesizer formed in accordance with the present invention.

FIG. 8 illustrates yet another alternate embodiment of a DDS formed in accordance with the present invention. As with FIG. 7, the embodiment illustrated in FIG. 8 also eliminates the digital phase shift circuit 32. The function of the digital phase shift circuit 32 is assumed by an enhanced dual phase accumulator 52 which replaces the phase accumulator 24 previously shown in FIG. 5. The dual phase accumulator 52 directly generates both the first and second address signals which are offset in equivalent phase value by 180 degrees.

Regardless of the physical embodiment chosen, a DDS formed in accordance with the present invention utilizes a common method to achieve reduced second harmonic content. Initially, first and second digital sine wave signals are generated which are offset in phase from one another by 180 degrees. Next, the first and second digital sine wave signals are converted to first and second analog signals. The first and second analog signals are identical in all respects except for a relative phase offset of the fundamental (and other odd harmonics) of 180 degrees. Finally, the first and second analog signals are subtracted from one another to achieve the desired output signal featuring enhanced fundamental level and reduced second (and higher order even) harmonic level.

By employing the circuits and method of the present invention, a DDS is formed which features a significant reduction in second harmonic content. Further, the harmonics are suppressed without the need for an analog phase shift circuit or analog filtering. By shifting the phase of signal components while the signal is represented digitally, the present invention achieves broad band even-harmonic cancellation without circuit adjustments or output signal loss in the desired signal.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A direct digital synthesizer which generates a frequency output signal having reduced second harmonic component, the direct digital synthesizer comprising:

means for generating a first digital sine wave signal, wherein the means for generating the first digital sine wave signal includes:
a phase accumulator circuit, the phase accumulator circuit generating a first address signal, the first address signal representing an equivalent phase value of the first digital sine wave signal; and
a first sine read only memory (ROM), the first sine ROM being responsive to the first address signal from the phase accumulator circuit and generating the first digital sine wave signal;

means for generating a second digital sine wave signal, the second digital sine wave signal being offset in relative phase by 180° from the first digital sine wave signal, wherein the means for generating the second digital sine wave signal includes:

the phase accumulator circuit;

a digital phase shift circuit, the digital phase shift circuit receiving the first address signal from the phase accumulator circuit and generating a second address signal in response thereto, the second address signal representing an equivalent phase value of the second digital sine wave signal, the equivalent phase value of the second digital sine wave signal being offset from the equivalent phase value of the first address signal by 180 degrees; and a second sine read only memory (ROM), the second sine ROM being responsive to the second address signal from the digital phase shift circuit and generating the second digital sine wave signal;

means for converting the first and second digital sine wave signals to first and second analog output analog output signals; and means for subtracting the second analog signal from the first analog signal to generate the frequency output signal.

2. A direct digital synthesizer, as defined by claim 1, wherein:

the means for converting the first digital sine wave signal to a first analog output signal further includes a first digital to analog convertor (D/A), the first D/A being responsive to the first digital sine wave signal and generating the first analog output signal, the first analog output signal having a fundamental component and a second harmonic component; and wherein the means for converting the second digital sine wave signal to a second analog output signal further includes a second D/A, the second D/A being responsive to the second digital sine wave signal and generating a second analog output signal, the second analog output signal having a fundamental component and a second harmonic component; and wherein the means for subtracting the second analog output signal from the first analog output signal further includes a subtractor circuit, the subtractor circuit receiving the first and second analog output signals and generating the frequency output signal therefrom, the frequency output signal being substantially equal to a difference between the first and second analog output signals, whereby the fundamental component of the first and second analog output signals substantially combine and the second harmonic component of the first and second analog output signals substantially cancel in the resultant frequency output signal.

3. A direct digital synthesizer, as defined by claim 1, wherein the means for generating the first digital sine wave signal includes:

a dual phase accumulator circuit, the dual phase accumulator circuit generating first and second address signals, the first and second address signals representing equivalent phase values of first and second digital sine wave signals respectively, the equivalent phase value of the first digital sine wave signal being offset from the equivalent phase value of the second digital sine wave signal by a value substantially equal to 180 degrees; and a first sine read only memory (ROM), the first sine ROM being responsive to the first address signal and generating the first digital sine wave signal; and wherein the means for generating the second digital sine wave signal includes:

the dual phase accumulator circuit; and a second sine read only memory (ROM), the second sine ROM being responsive to the second address signal and generating the second digital sine wave signal.

4. A direct digital synthesizer, as defined by claim 3, wherein:

the means for converting the first digital sine wave signal to the first analog output signal includes a first digital to analog convertor (D/A), the first D/A being responsive to the first digital sine wave signal and generating the first analog output signal, the first analog output signal having a fundamental component and a second harmonic component; and wherein the means for converting the second digital sine wave signal to the second analog output signal includes a second D/A, the second D/A being responsive to the second digital sine wave signal and generating the second analog output signal, the second analog output signal having a fundamental component and a second harmonic component; and wherein the means for subtracting the second analog output signal from the first analog output signal further includes a subtractor circuit, the subtractor circuit receiving the first and second analog output signals and generating the frequency output signal therefrom, the frequency output signal being substantially equal to a difference between the first and second analog output signals, whereby the fundamental component of the first and second analog output signals combine and the second harmonic component of the first and second analog output signals cancel in the resultant frequency output signal.

5. A direct digital synthesizer, as defined by claim 1, wherein the means for generating the first digital sine wave signal comprises:

a phase accumulator circuit, the phase accumulator circuit generating an address signal;

a sine read only memory (ROM), the sine ROM being responsive to the address signal and generating the first digital sine wave signal; and wherein the means for generating the second digital sine wave signal comprises:

the phase accumulator circuit; and an anti-phase sine read only memory (ROM), the anti-phase sine ROM being responsive to the address signal and generating the second digital sine wave signal.

6. A direct digital synthesizer, as defined by claim 5, wherein:

the means for converting the first digital sine wave signal to the first analog output signal includes a first digital to analog convertor (D/A), the first D/A being responsive to the first digital sine wave signal and generating the first analog output signal, the first analog output signal having a fundamental component and a second harmonic component; and wherein the means for converting the second digital sine wave signal to the second analog output signal includes a second D/A, the second D/A being responsive to the second digital sine wave signal and generating the second analog output signal, the second analog output signal having a fundamental component and a second harmonic component; and wherein the means for subtracting the second analog output signal from the first analog output signal further includes a subtractor circuit, the subtractor circuit receiving the first and second analog output signals and generating the frequency output signal therefrom, the frequency output signal being substantially equal to a difference between the first and second analog output signals, whereby the fundamental component of the first and second analog output signals combine and the second harmonic component of the first and second analog output signals cancel in the resultant frequency output signal.

7. A direct digital synthesizer which generates a frequency output signal in response to received frequency value and phase clock signal inputs, the direct digital synthesizer comprising:

a phase accumulator circuit, the phase accumulator circuit receiving the frequency value and phase clock signals and generating a first address signal in response thereto, the first address signal representing an equivalent phase value of a first digital sine wave signal;

a digital phase shift circuit, the digital phase shift circuit receiving the first address signal from the phase accumulator circuit and generating a second address signal in response thereto, the second address signal representing an equivalent phase value of a second digital sine wave signal, the second address signal being offset with respect to the first address signal such that the equivalent phase value of the first and second digital sine wave signals are separated by 180 degrees;

a first sine read only memory (ROM), the first sine ROM being responsive to the first address signal from the phase accumulator circuit and generating the first digital sine wave signal;

a first digital to analog convertor (D/A), the first D/A being responsive to the first digital sine wave signal and generating a first analog output signal, the first analog output signal having a fundamental component and a second harmonic component;

a second sine read only memory (ROM), the second sine ROM being responsive to the second address signal from the digital phase shift circuit and generating the second digital sine wave signal;

a second digital to analog convertor (D/A), the second D/A being responsive to the second digital sine wave signal and generating a second analog output signal, the second analog output signal having a fundamental component and a second harmonic component; and a subtractor circuit, the subtractor circuit receiving the first and second analog output signals and generating the frequency output signal therefrom, the frequency output signal being substantially equal to a difference between the first and second analog output signals, whereby the fundamental component of the first and second analog output signals combine and the second harmonic component of the first and second analog output signals substantially cancel in the resultant frequency output signal.

8. A direct digital synthesizer which generates a frequency output signal in response to received frequency value and phase clock signal inputs, the direct digital synthesizer comprising:

a dual phase accumulator circuit, the dual phase accumulator circuit receiving the frequency value and phase clock signals and generating first and second address signals in response thereto, the first and second address signals representing an equivalent phase value of a first and a second digital sine wave signal respectively, the equivalent phase value of the second digital sine wave signal being offset from the equivalent phase value of the first digital sine wave signal by a value substantially equal to 180 degrees; a first sine read only memory (ROM), the first sine ROM being responsive to the first address signal and generating the first digital sine wave signal;

a first digital to analog convertor (D/A), the first D/A being responsive to the first digital sine wave signal and generating a first analog output signal, the first analog output signal having a fundamental component and a second harmonic component;

a second sine read only memory (ROM), the second sine ROM being responsive to the second address signal and generating the second digital sine wave signal;

a second digital to analog convertor (D/A), the second D/A being responsive to the second digital sine wave signal and generating a second analog output signal, the second analog output signal having a fundamental component and a second harmonic component; and a subtractor circuit, the subtractor circuit receiving the first and second analog output signals and generating the frequency output signal therefrom, the frequency output signal being substantially equal to a difference between the first and second analog sine wave signals, whereby the fundamental component of the first and second analog output signals combine and the second harmonic component of the first and second analog output signals substantially cancel in the resultant frequency output signal.

9. A method of generating an output signal from a direct digital synthesizer, the output signal having an enhanced fundamental component and a reduced second harmonic component, the method comprising the steps of:

a. generating a first address signal, the first address signal representing an equivalent phase value of a first digital sine wave signal;

b. generating the first digital sine wave signal in response to the first address signal;

c. generating a second address signal, the second address signal representing an equivalent phase value of a second digital sine wave signal, the equivalent phase value of the second digital sine wave signal being offset from the equivalent phase value of the first address signal by 180 degrees;

d. generating the second digital sine wave signal in response to the first address signal;

e. converting the first digital sine wave signal to a first analog output signal and converting the second digital sine wave signal to a second analog output signal, the first and second analog output signals having first and second fundamental components, respectively, which are substantially equal in frequency and amplitude and are substantially out of phase with one another, the first and second analog output signals also having first and second harmonic components, respectively, which are substantially equal in frequency and amplitude and are substantially in phase with one another, and f. subtracting the second analog output signal from the first analog output signal, whereby the first and second fundamental components combine and the first and second harmonic components cancel to generate the resultant frequency output signal, the frequency output signal being substantially equal to a difference between the first and second analog output signals.

* * * * *